United States Patent Office 3,441,766
Patented Apr. 29, 1969

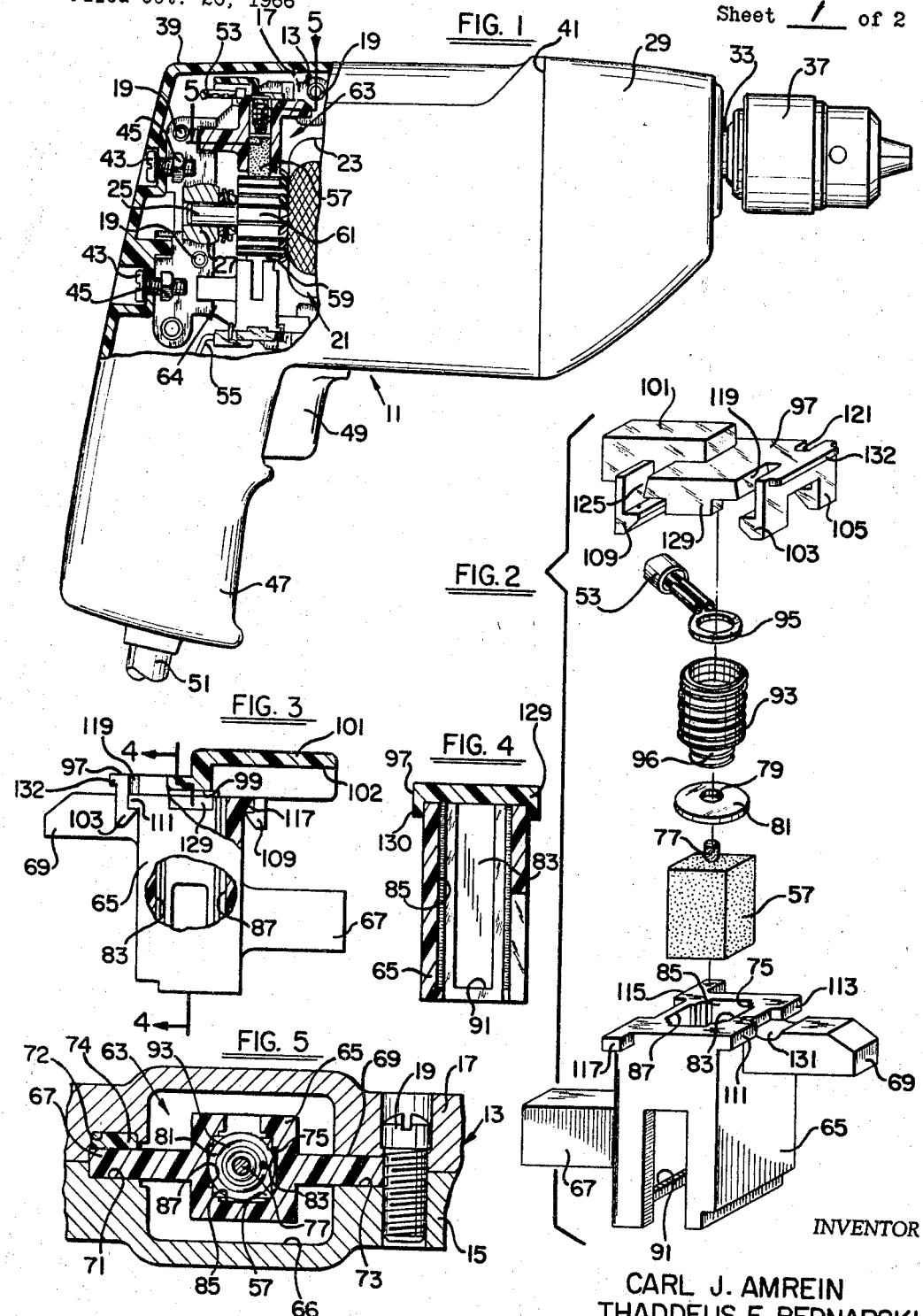
April 29, 1969     C. J. AMREIN ET AL     3,441,766
ELECTRICAL MOTOR BRUSH HOLDER ASSEMBLY
Filed Oct. 26, 1966     Sheet 1 of 2
INVENTOR
CARL J. AMREIN
THADDEUS E. BEDNARSKI
BY Joseph R. Slotnik
ATTORNEY April 29, 1969    C. J. AMREIN ET AL    3,441,766
ELECTRICAL MOTOR BRUSH HOLDER ASSEMBLY
Filed Oct. 26, 1966    Sheet 2 of 2
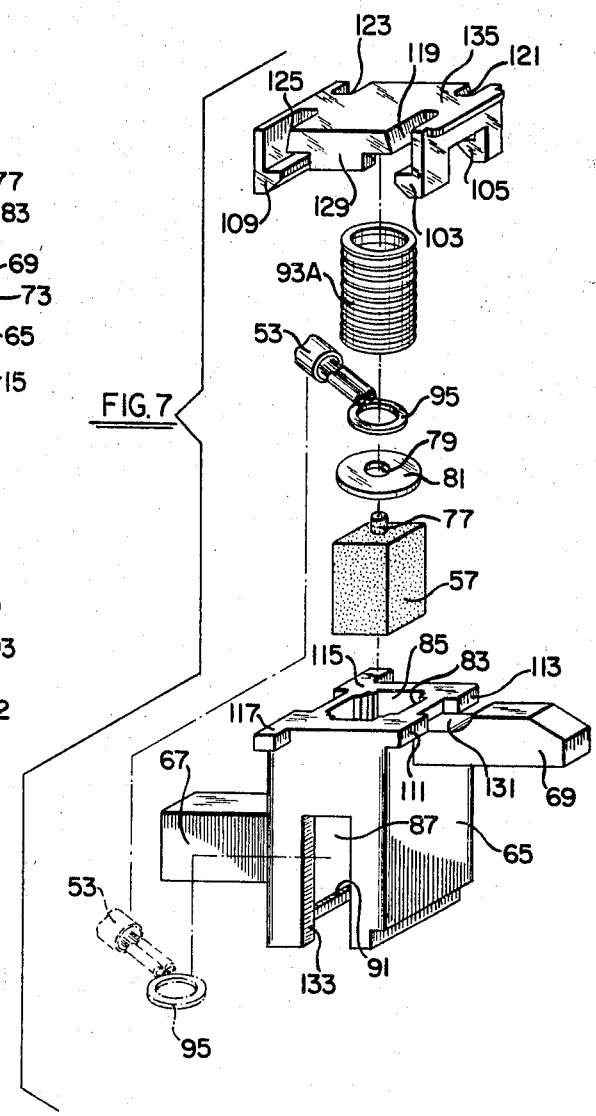
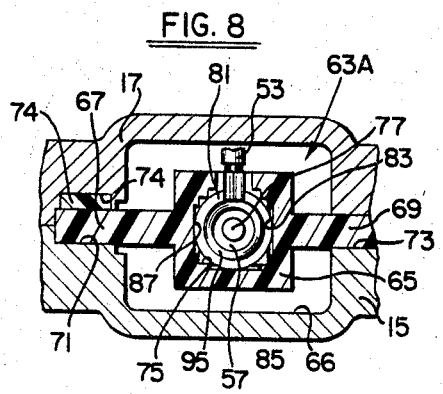
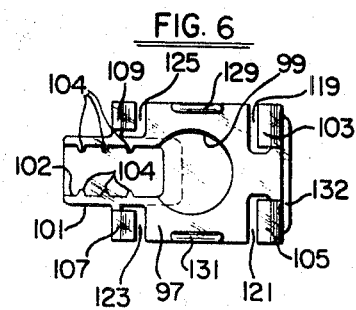
*INVENTOR*
CARL J. AMREIN
THADDEUS E. BEDNARSKI
BY Joseph R. Slotnik
*ATTORNEY*

3,441,766
ELECTRICAL MOTOR BRUSH HOLDER ASSEMBLY
Carl J. Amrein, Baltimore, and Thaddeus E. Bednarski, Timonium, Md., assignors to The Black and Decker Manufacturing Company, Towson, Md., a corporation of Maryland
Filed Oct. 26, 1966, Ser. No. 589,716
Int. Cl. H02k 5/14
U.S. Cl. 310—239                    12 Claims

ABSTRACT OF THE DISCLOSURE

The device disclosed herein is a portable electric drill which includes a housing having an electric motor therein and a pendant type handle rigid therewith. The motor drives a rotary spindle and chuck and is powered from an electrical source. A trigger switch is provided on the handle for motor control and current is delivered thereto through electrical brushes which engage a commutator. The brushes are carried by and form part of a novel brush holder assembly supported in a novel manner within the housing.

---

This invention relates generally to electric motor devices, and particularly to an improved electrical motor brush holder assembly and mounting therefor.

Important objects of the present invention are to provide an improved electric motor brush holder assembly which includes an insulated brush holder adapted to carry and retain the electrically conductive parts therein during use and one which requires no separate fasteners, supports or adapters for mounting the same in place.

Another important object of the present invention resides in the provision of an improved brush holder assembly of the above character which meets strict insulation and safety requirements.

Still another object of the present invention is to provide an improved brush holder assembly of the above character which permits rapid assembly and disassembly for part replacement.

Further objects of the present invention include the provision of an improved brush holder assembly of the above character which is relatively inexpensive to manufacture, rugged in construction and reliable in use.

Other objects and advantages of the present invention will become more apparent from a consideration of the following detailed description taken in conjunction with the drawings in which:

FIG. 1 is a side elevational view, partly in section, illustrating a typical portable electrical power tool embodying the present invention;

FIG. 2 is an exploded perspective view of a preferred form of brush holder and the parts carried thereby constructed according to the present invention;

FIG. 3 is an elevational view, partly in section, illustrating the assembly brush holder of FIG. 2.

FIG. 4 is a sectional view of FIG. 3 taken along the line 4—4 thereof.

FIG. 5 is an enlarged sectional view of FIG. 1 taken along the line 5—5 thereof.

FIG. 6 is a bottom plan view of the brush holder cap employed with the form of the invention illustrated in FIGS. 2–5;

FIG. 7 is an exploded view, similar to FIG. 2, illustrating a modified form of the present invention; and FIG. 8 is a view similar to FIG. 5, illustrating the assembled parts of FIG. 7.

Broadly described, the present invention relates to a brush holder assembly comprising a frame, a rigid insulating body rigidly supported directly by said frame and having a passageway therethrough, an electrical brush disposed in said passageway and adapted to extend outwardly of one end thereof to engage a rotating commutator, an electrical lead having a terminal end overlaying said passageway at the other end thereof, a removable cap on said body closing the other end of said passageway and trapping and engaging said electrical lead terminal end, a conductive compression spring in said passageway electrically connecting said terminal end and said brush and normally biasing said brush outwardly of said body, retainer means associated with said spring, and stop means on said body cooperable with said retainer means for preventing said spring from being withdrawn from said passageway one end.

In another aspect, the present invention relates to a brush holder assembly comprising a frame, a rigid insulating body having a cavity therein opening to at least one end thereof, a carbon brush slidable in said cavity, resilient means within said cavity and normally biasing said brush outwardly of said body one end and into engagement with a commutator, said body having at least a pair of spaced projections formed thereon, said frame including detachable portions cooperable with said projections to secure said body rigidly on said frame, said body when secured to said frame being spaced from said frame whereby said brush is insulated from said frame by said insulating body and an air gap.

Referring now more particularly to the drawings, a typical portable electric power drill, which is one electric device with which the present invention finds particular use, is illustrated generally at 11 in FIG. 1 and is seen to include a frame 13 comprising detachable mating frame members 15, 17 held together by screws 19 (see also FIG. 5). The frame members 15, 17 are generally rectangular, skeleton-like in configuration and are secured together in clam-shell relation. An electric drive motor 21 is disposed within an opening 23 defined by the legs of the frame members 15, 17 and has a longitudinally extending rotatable armature shaft 25 supported adjacent each end by spherical bearings 27 (only one of which is shown) which are trapped between and carried by the attached frame members 15, 17.

The forward end of the armature shaft 25 may extend into a generally cylindrical shaped gear case 29 preferably formed in two parts which are integrally formed with respective ones of the frame members 15, 17. The forwardmost end of the armature shaft is drivingly interconnected with an output spindle 33 through a suitable gear transmission (not shown) positioned in the gear case 29. The spindle 33 is supported by a bearing (not shown) trapped between the two portions of the gear case 29 and may have a suitable tool bit receiving chuck 37 keyed thereto. A unitary shell-like cover casing 39 encompasses the open motor portion of the frame 13 and seats against an abutment shoulder 41 on the frame 13 and is secured in place by bolts 43 threaded in nuts 45 trapped between the frame members 15, 17. The cover casing 39 has a dependent pistol-grip handle 47 provided with a trigger switch 49 and a conventional line cord 51. The frame members 15, 17 are constructed of die cast metal, preferably aluminum while the cover casing 39 preferably is a molded nylon or self-extinguishing plastic. For a better understanding of the motor support construction of the frame 13 and the details of the drive motor 21 and the transmission, reference may be made to copending application of Martin I. Sheps et al., Ser. No. 601,143, filed Dec. 12, 1966, and owned by the assignee of the present application. However, since this construction forms no part of the present invention, it is not illustrated nor described further here.

Electric current is transmitted from a suitable source (not shown) through a pair of conductors extending through the line 51 and into the handle 47 and cover casing 39. One of these conductors shown at 55 is electrically connected to a brush while the other conductor is connected to the trigger switch 49. Another conductor 53 connects the motor 21 and the brush 59, and the motor 21 is connected to the switch 49 which, in turn, has the other line cord conductor connected thereto. The brushes 57, 59, in turn, engage a commutator 61 fixed to the armature shaft 25. According to the present invention, the brushes 57, 59 are carried by novel brush holder assemblies 63, 64 which are supported upon the frame 13 in a novel manner, and since these holder assemblies and their manner of support are substantially identical, a description of one will suffice here, it being understood the like numerals refer to like parts for both holder assemblies.

Referrring now to FIGS. 2–6, the brush holder assembly 63 is seen to include a body 65 constructed from a molded insulating material such as, for example, a phenolic, and which is located in an aperture 66 formed betwen the frame members 15, 17. The body 65 is provided with a pair of laterally projecting arms 67, 69 which are trapped in slots 71, 73 formed between the frame members 15, 17, and has a rectangular cross-sectional central passageway 75 extending therethrough. If desired, the frame members 15, 17 may have one or more recesses 72 adjacent the slots 71, 73 receiving a rubberlike plug 74 which engages and is squeezed by the arms 67, 69 in assembly to insure a snug fit between the arms and the frame members 15, 17 and take up any slack therebetween.

The brush 57 is shown to have a rectangular cross-sectional configuration generally complementary to the passageway 75 and is slidably disposed therein. The outer end of the brush 57 extends outwardly beyond the body 65 and is adapted to engage the commutator 61. The upper end of the brush has a projection 77 shown as cylindrical but not necessarily so, and adapted to extend through an opening 79 formed in a metallic retainer washer 81. The washer 81 has a diametral dimension larger than the lateral dimensions of the brush 57 and the washer extends into channel shaped recesses 83, 85, 87 formed in the body 65 adjacent the passageway 75. Alternatively, the washer 81 could be dimensioned smaller and be formed with two or more outwardly extending projections adapted to slide in two or more of the recesses 83, 85, 87. In any event, an abutment shoulder 91 is formed on the body 65 at the lower end of the channel recesses 83, 85, 87 to engage the portion of the washer 81 within the channels and prevent escape of the washer 81 from this end of the body 65. This abutment shoulder 91, however, does not interfere with movement of the brush 57.

A metallic compression spring 93 is positioned within the passageway 75 behind and engaging the washer 81 to bias it and the brush 57 toward the commutator 61. In addition, the upper end of the spring 93 engages a terminal end 95 of the conductor 53 held in place over the passageway 75 by a brush holder cap 97 and the lower end of the spring 93 has at least one tightly wound turn 96 press-fitted on the brush projection 77. As shown in FIG. 6, the cap 97 may be constructed of rigid, transparent plastic material and has a circular depression 99 on its underside adapted to receive the conductor terminal end 95 and has a sleeve-like lateral extension 101 defining a narrow channel 102 communicated with the depression 99 and receiving the conductor 53. If desired, the cap extension 101 can have teeth-like projections 104 which engage and retain the lead 53 therein. The cap 97 is removably held in place on the body 65 by four hook-like lips 103, 105, 107, 109 which engage beneath laterally projecting flanges 111, 113, 115, 117, respectively, on the body 65 and when the casing 39 is in position on the frame 13, as shown in FIG. 1, the cap 97 is prevented from coming off the body 65. The lips 103, 105, 107, 109 are tapered outwardly at their lower ends as shown best in FIG. 2 and are made somewhat flexible by forming slots 119, 121, 123, 125 in the cap 97 adjacent thereto so that the cap can easily be snapped into place on the body 65. The arm 69 is grooved at 131 so that the cap 97 is assembled to the body 65 by first hooking the lips 103, 105 beneath the body flanges 111, 113 and then pressing downwardly and rearwardly on the cap 97 at the sleeve 101 causing the lips 107, 109 to snap over and engage beneath the flanges 115, 117. The cap 97 has a pair of dependent projections 129, 130 to prevent it from slipping laterally off the body 65. To remove the cap 97, upward pressure is applied beneath the sleeve 101 to disengage the lips 107, 109 from the flanges 115, 117. Alternatively, the lips 103, 105 can be first disengaged from the flanges 111, 113 and to this end, the cap 97 may have a flange 132 under which a suitable tool may be placed to pry the cap 97 upwardly. More importantly, the flange serves as a truss to strengthen the lips 103, 105.

In assembly, the spring 93 electrically interconnects the conductor terminal end 95 and the cylindrical projection 77 forming a part of the brush 57. The spring 93 acting on the washer 81 biases he brush 57 into engagement with the commutator 61 and maintains their engagement even as the brush 57 wears. When the brush 57 is nearly completely worn, the washer 81 seats on the abutment shoulder 91, to prevent the washer and the spring 93 from coming out of the holder body 65. Thereafter, the casing 39 can be removed, the cap 97 snapped off the body 65 through the aperture 66 and the brush 57 replaced. Importantly, the cap 97 holds the lead 53 securely in place and the abutment shoulder 91 prevents the washer 81 and therefore the conducting spring 93 from exiting the body 65 so that there is no possibility of any of the frame components being electrically connected to either one of the leads 53, 55. In addition, the washer 81 and spring 93 are prevented from getting loose in the housing 39 where they might damage the motor 21.

An important feature of the present invention resides in the particular mounting of the brush holder body 65 within the frame 13. Thus, the trapped arms 67, 69 positively locate and secure the body 65 relative to the frame 13 without the need for any separate supports, connectors or adapters. The body 65 is, as described above, constructed from insulating material and in addition, the body 65 as mounted is spaced from the frame 13, as shown in FIG. 5. Thus, it is not necessary to construct the walls of the body 65 of the thickness necessary to meet insulation standards such as, for example, "double insulation" standards. Rather, the thickness of the body walls and the thickness of the air gap between the body walls and the frame 13 together are used to meet the dimensional insulating requirements. Thus, the required wall thickness of the body 65 is reduced considerably over that which would be necessary were the walls of the body 65 directly engaged with the frame 13. This, in turn, substantially reduces manufacturing costs and the cost to the consumer.

It will be appreciated that the arms 67, 69 engage the metal frame 13 and therefore must possess the necessary thickness dimension to satisfy the insulation requirements referred to above; however, the length of these arms 67, 69 together with the adjacent wall thickness of the body 65 provides the necessary insulating thickness to meet the standards. Furthermore, the arms 67, 69 replace conventional supporting connectors for brush holders and are not only less expensive to make but also make it materially easier to install and remove the brush holder body from the frame 13 and provide a completely safe construction.

A modified form of brush holder assembly of the present invention is illustrated in FIGS. 7 and 8. In this embodiment, shown generally at 63A, the lead terminal end 95 is inserted through a slot 133 formed in one side of the brush holder body 65 and is located between a compression spring 93A and the retainer washer 81. The spring 93A and washer 81 are substantially identical in all respects to the spring 93 and washer 81 described above in the embodiment of FIGS. 2-6 with the exception that the spring 93A does not have a tightly wound turn, as shown at 96 in FIG. 2, and simply presses the terminal end 95 against the washer 81 which electrically connects the terminal end 95 and the brush 57. Likewise, the brush holder body 65 shown in FIGS. 7 and 8 is substantially identical to the body described in FIGS. 2-6, having a passageway 75 therethrough provided with recesses 83, 85, 87 and an abutment shoulder 91. The retainer washer 81 is pressed against the brush 57 by the spring 93A and slides in the passageway 75 in engagement with the center point of the walls of the recesses 83, 85, 87. When the brush has substantially completely worn, the retainer washer 81 seats against the abutment shoulder 91 and is prevented from coming out of the passageway 75. This, in turn, holds both the lead 53 and the spring 93A in the brush holder body 65 and renders the assembly completely safe.

The parts are held in place within the passageway 75 by a removable cap 135 which is substantially identical to the cap 97 described above for the embodiment of FIGS. 2-6 except that the cap 135 need not have the sleeve extension 101 and does not need the recess formation 99 described for the previous embodiment. The cap 135 is, however, provided with the tapered lips 103, 105, 107, 109 adapted to snap over and engage the flanges 111, 113, 115, 117 on the body 65 and is provided with the slots 119, 121, 123, 125 adjacent these lips to render them sufficiently flexible. Depending projections 129, 131 on the cap 135 prevent it from sliding laterally off the body 65 and a lateral flange 132 facilitates use of a screw driver or the like to pry the cap 135 off the body 65.

The brush holder assembly 63A shown in FIGS. 7 and 8 is mounted in substantially the same fashion as the assembly 63 of FIGS. 2-6. Thus, the body 65 of FIGS. 7 and 8 is provided with a pair of arms 67, 69 adapted to be received and trapped in slots 71, 73 formed between the frame members 15, 17. The brush holder body 65 is securely positioned in the frame aperture 66 and the live parts are insulated from the frame members 15, 17 by the body 65, the arms 67, 69 and the air space between the body 65 and the frame members 15, 17. In all other respects, the construction of the brush holder assembly 63A of FIGS. 7 and 8 is identical to the assembly 63 of FIGS. 2-6.

By the foregoing, there has been provided an improved brush holder assembly and assembly mounting calculated to fulfill the inventive objects set forth, and while preferred embodiments have been illustrated and described above in detail, various additions, substitutions, modifications and omissions may be made thereto without departing from the spirit of the invention as encompassed by the appended claims.

We claim:

1. A brush holder assembly comprising a frame, a rigid insulating body rigidly supported directly by said frame and having a passageway therethrough, an electrical brush disposed in said passageway and adapted to extend outwardly of one end thereof to engage a rotating commutator, an electrical lead having a terminal end overlaying said passageway at the other end thereof, a removable cap on said body closing the other end of said passageway and trapping and engaging said electrical lead terminal end, a conductive compression spring in said passageway electrically connecting said terminal end and said brush and normally biasing said brush outwardly of said body, retainer means within said passageway between said spring and said brush, and stop means on said body preventing said retainer means from being withdrawn from said passageway one end.

2. An assembly as defined in claim 1 wherein said retainer means includes a washer slidably disposed in said body, said body having an abutment shoulder therewithin adjacent said open end and engageable with said washer to prevent said washer from being withdrawn from said open end, said electrical lead terminal end and said resilient means being positioned behind said washer, and said brush being positioned in front of said washer.

3. A brush holder assembly comprising a frame, a rigid insulating body having a cavity therein opening to at least one end thereof, a carbon brush slidable in said cavity, resilient means within said cavity and normally biasing said brush outwardly of said body one end and into engagement with a commutator, said body having at least a pair of spaced projections formed thereon, said frame including detachable portions cooperable with said projections to secure said body rigidly on said frame, said body when secured to said frame being spaced from said frame whereby said brush is insulated from said frame by said insulating body and an air gap.

4. An assembly as defined in claim 3 wherein said projection means includes at least a pair of laterally projecting arms, said frame including detachable members having at least a pair of recesses formed at the parting line thereof, said recesses receiving and trapping said projecting arms.

5. An assembly as defined in claim 1 wherein said passageway is generally rectangular in cross-section and has at least three longitudinally extending recesses in adjacent walls thereof, said washer having portions adapted to slide in said recesses, said stop means including shoulder means in said body adjacent said open end and defining the end of said recesses, whereby to prevent removal of said washer through said open end.

6. An assembly as defined in claim 5 wherein said brush is generally rectangular in configuration and is adapted to slide in said passageway free of said recesses and said abutment shoulder.

7. An assembly as defined in claim 1 wherein said cap has a sleeve extension receiving said electrical lead and communicated with a recess receiving said terminal end.

8. An assembly as defined in claim 5 wherein said washer is generally circular and extends into said recesses.

9. An assembly as defined in claim 1 wherein said brush is provided with a projection at the inner end thereof, said retainer means having an opening receiving said projection, said spring having at least one turn tightly fitted on said projection to electrically connect said terminal end and said brush.

10. An assembly as defined in claim 1 wherein said body is provided with laterally extending flange means integral therewith, said cap having flexible lip means adapted to snap over and engage behind said flange means to removably hold said cap in place.

11. An assembly as defined in claim 10 wherein said cap has slot means adjacent said lip means enhancing the flexibility thereof.

12. A brush holder assembly comprising a frame, a rigid insulating body rigidly supported directly by said frame and having a passageway therethrough, an electrical brush disposed in said passageway and adapted to extend outwardly of one end thereof to engage a rotating commutator, an electrical lead having a terminal end overlaying said passageway at the other end thereof, a removable cap on said body closing the other end of said passageway and trapping and engaging said electrical lead terminal end, a conductive compression spring in said passageway electrically connecting said terminal end and said brush and normally biasing said brush outwardly of said body, retainer means associated with said spring, and stop means on said body cooperable with said retainer means for preventing said spring from being withdrawn from said passageway one end.

References Cited

UNITED STATES PATENTS 3,339,098  8/1967  Burrows et al. _____ 310—247

FOREIGN PATENTS 564,982  10/1958  Canada.

MILTON O. HIRSHFIELD, *Primary Examiner.*

G. P. TOLIN, *Assistant Examiner.*

U.S. Cl. X.R.

310—50, 47